United States Patent [19]
Andrews

[11] Patent Number: 5,381,095
[45] Date of Patent: Jan. 10, 1995

[54] METHOD OF ESTIMATING LOCATION AND ORIENTATION OF MAGNETIC DIPOLES USING EXTENDED KALMAN FILTERING AND SCHWEPPE LIKELIHOOD RATIO DETECTION

[75] Inventor: Angus P. Andrews, Westlake Village, Calif.

[73] Assignee: Rockwell International Corporation, Seal Beach, Calif.

[21] Appl. No.: 80,907

[22] Filed: Jun. 21, 1993

[51] Int. Cl.⁶ .................. G01V 3/10; G01R 33/02; G08G 1/0968; G06F 15/50
[52] U.S. Cl. ............................. 324/326; 324/244; 324/260; 364/424.02; 364/436; 340/988
[58] Field of Search ................ 340/995, 988; 364/424.02, 436; 324/207.24, 207.11, 228, 244, 326, 260

[56] References Cited

U.S. PATENT DOCUMENTS

| | | | |
|---|---|---|---|
| 3,661,089 | 5/1972 | Soltz | 324/251 X |
| 4,361,202 | 11/1982 | Minovitch | 180/168 |
| 4,622,644 | 11/1986 | Hansen | 324/251 X |
| 4,908,557 | 3/1990 | Sudare et al. | 364/424.02 X |
| 5,235,514 | 8/1993 | Matsuzaki | 340/995 X |
| 5,272,639 | 12/1993 | McGuffin | 364/449 |
| 5,297,050 | 3/1994 | Ichimura et al. | 340/995 X |
| 5,319,561 | 6/1994 | Matsuzaki | 364/454 |

OTHER PUBLICATIONS

Andrews, A. P., "The Accuracy of Navigation Using Magnetic Dipole Beacons," Navigation: *Journal of The Institute of Navigation*, vol. 38, No. 4, kpp. 367–381, Winter 1991–1992.

Primary Examiner—Kenneth A. Wieder
Assistant Examiner—R. Phillips
Attorney, Agent, or Firm—John C. McFarren

[57] ABSTRACT

A method for real time processing of information received from a plurality of permanent magnets embedded in the pavement of an Intelligent Vehicle Highway System. A sequence of magnet orientations provides coded information to sensors mounted on automotive vehicles. The method uses a combination of extended Kalman filtering and Schweppe likelihood estimation to determine the relative location and orientation of the magnets. A separate location estimator (extended Kalman filter) is provided for each of the possible magnet orientations. A decision process identifies the most likely orientation of the magnet, and the Kalman filter selected by the process contains the best estimate of the location of the magnet. Schweppe likelihood estimation is extended to use the detector as a decoder of the information provided by the orientation sequence of the magnets. Failure of the decision process to arrive at a clearly defined decision (resulting, for example, from a missing or defective magnet) can be carried to a higher decoding level in which possible sequences of orientations and their relative likelihood can be used to select the most likely sequence.

10 Claims, 1 Drawing Sheet

METHOD OF ESTIMATING LOCATION AND ORIENTATION OF MAGNETIC DIPOLES USING EXTENDED KALMAN FILTERING AND SCHWEPPE LIKELIHOOD RATIO DETECTION

TECHNICAL FIELD

The present invention relates to magnetic sensors and signal processors and, in particular, to a method of estimating the location and orientation of permanent magnets embedded in a highway.

BACKGROUND OF THE INVENTION

The earth's magnetic field has provided a low-cost, reliable aid to navigation for many centuries. The direction of the horizontal component of the magnetic field is measurable by inexpensive instrumentation, and the derived information is used for determining horizontal bearing directions in terms of magnetic heading (i.e., azimuth angles). Among the methods proposed for guiding vehicles within traffic lanes of automated highways is the use of small permanent magnets buried in the pavement. The field patterns from the small magnets can provide a reliable navigation and signaling medium for the Intelligent Vehicle Highway System (IVHS). A concept under study uses "magnetic nails" embedded in the pavement of traffic lanes to provide reference "beacons" for guiding autonomous vehicles within the lanes and for transferring navigational information (encoded in the magnet orientations) to the vehicle and its occupants. Magnetic sensors mounted under the automotive vehicles will sense the magnetic fields produced by the embedded magnets. The system is inexpensive and reliable because the magnets require no power source and are embedded below the highway surface where they are unaffected by environmental conditions. A signal processing method must be established, however, to interpret the detected magnetic fields and to determine the orientation of each magnet and the location of the vehicle within the traffic lane (i.e., its position with respect to each magnet).

A similar problem arises in the detection and location of submarines. Airborne magnetic sensors are used for detecting the presence of submerged submarines by measuring their disturbance of the natural magnetic field. Signal processing methods used for detecting submarines are based on work done in 1949 by John E. Anderson, who showed that signals arising from the principal (dipole) field disturbance can be represented as linear combinations of three basis functions. These functions are now commonly called "Anderson functions." Methods for detecting and locating submarines from the anomalies they produce in the natural magnetic field are based on detecting and estimating the relative magnitudes of the Anderson functions in the signals. These magnitudes can then be used to estimate the location of the submarine producing the anomalies. A problem with this method is that Anderson function definitions include the time of closest approach as an unknown parameter. Estimating the time of closest approach from the signal data, however, is computationally difficult. Another problem is that the method ignores noise in the signals, and the nonlinear character of the inversion process can introduce bias errors from zero-mean noise.

Kalman filtering, a process described by R. E. Kalman in 1960, uses a feedback correction filter for estimating the state of a linear Gaussian process. Kalman filtering is statistically optimal with respect to quadratic loss functions of estimation error. Extension of the process for nonlinear problems, known as "extended Kalman filtering," uses partial derivatives of the signal with respect to unknown variables. Using this approach, the magnet location and orientation problem was solved in 1988 as a nonlinear estimation problem in which the unknown quantities are the three position components of a magnetic source (i.e., a magnetic dipole) and the three components of the dipole moment vector. Detector measurements of magnetic "signals" can be shown to be linear functions of the dipole moment vector, but nonlinear functions of the relative location of the dipole. The problem is linearized by approximating the nonlinearities with local linearities-computed as partial derivatives evaluated at the estimated dipole positions. The number of "unknowns" using extended Kalman filtering is six: three position components and three dipole moment components. Although a useful process, extended Kalman filtering is computationally complex and, in the case of magnets embedded in a highway, it does not take advantage of the a priori knowledge that there are only a finite number of discrete orientations used for the embedded magnets.

A signal processing technique known as Schweppe likelihood ratio detection was described by F. C. Schweppe in 1963. Schweppe likelihood ratio detection uses a Kalman filter for each of two contending models for a signaling process. The method computes the relative likelihood that each of the contending models is correct based on differences between the predicted and measured signals. As originally formulated by Schweppe, the method uses a fixed threshold value of the ratio of the likelihoods of the two contending models to make a decision. A trade-off between false detection rate and failure-to-detect is typically used for selecting the threshold.

An alternative approach for magnet detection based on pattern classification divides the possible conditions for the relative magnet location (i.e., with respect to the sensor) into discrete classes, such as "far on the left," "far on the right," "close on the left," "close on the right," and "right underneath." Methods of pattern analysis and classification are then used to determine which category best characterizes the signals obtained in a pass near or over a magnet. A problem with this method is that the position information is more qualitative than quantitative, thus providing poor position resolution.

For an embedded magnet subsystem, acceptable system-level performance of IVHS requires an accurate and reliable method for determining the location and orientation of embedded magnets and processing the received information in real time. The method must also exhibit robustness against unexpected signal data, such as that caused by missing magnets, anomalous noise, and accidental or deliberate spills of interfering magnetic material.

SUMMARY OF THE INVENTION

The present invention comprises a method of estimating the location and orientation of permanent magnets (magnetic dipoles) embedded in the pavement of an Intelligent Vehicle Highway System (IVHS) by using magnetic sensors mounted on automotive vehicles. Although the magnets are constrained to have a finite number of known orientations, the orientation of any particular magnet is not known a priori. The orientations of the magnets provide the "symbols" of a code comprising a sequence of orientations of successive magnets embedded in the highway. The magnetic sensors of an automotive vehicle thus receive encoded data as the vehicle passes over the magnets embedded in the highway.

The present invention uses a combination of extended Kalman filtering and an extension of Schweppe likelihood estimation to determine the relative location and orientation of the embedded magnets. A separate location estimator (i.e., an extended Kalman filter) is provided for each of the possible magnetic dipole moments (the finite number of given magnet orientations). Each estimator assumes a different one of the magnetic dipole moment directions and predicts the expected sensor outputs based on its estimate of the magnet location and assumed orientation.

Differences between the predicted sensor outputs and the measured sensor outputs are used for a) estimating the relative likelihood that the assumed magnet orientation is the correct one, and b) refining the estimated location of the magnet. A decision process, using an extension of the Schweppe likelihood estimation technique, is applied to the relative likelihood data provided by the extended Kalman filters. The magnet orientation estimated to be the most likely, based on this decision process, is selected as the correct one. Thus, the decision process identifies the orientation of the magnet, and the corresponding Kalman filter selected by the decision process contains the best estimate of the location of the magnet.

Schweppe likelihood estimation is further extended to use the detector as a decoder of the data provided by the orientation sequence of the plurality of embedded magnets. The relative likelihood information can be used for detection and correction of decoding errors. Failure of the decision process at a symbol (i.e., one magnet orientation) to arrive at a clearly defined decision (resulting, for example, from a missing or defective magnet) can be carded to a higher decoding level in which possible sequences of symbols and their relative likelihood can be used to select the most likely sequence.

A principal object of the invention is real time processing of coded magnetic information detected by vehicles operating on an Intelligent Vehicle Highway System. A feature of the invention is use of extended Kalman filtering combined with Schweppe likelihood estimation to determine the location and orientation of magnets embedded in a highway. An advantage of the invention is rapid decoding of information provided by the sequence of permanent magnets embedded in a highway using a magnetic sensor and processor system mounted on an automotive vehicle.

BRIEF DESCRIPTION OF THE DRAWINGS

For a more complete understanding of the present invention and for further advantages thereof, the following Derailed Description of the Preferred Embodiment makes reference to the accompanying Drawings, in which.

DETAILED DESCRIPTION OF THE INVENTION

Figure 1:
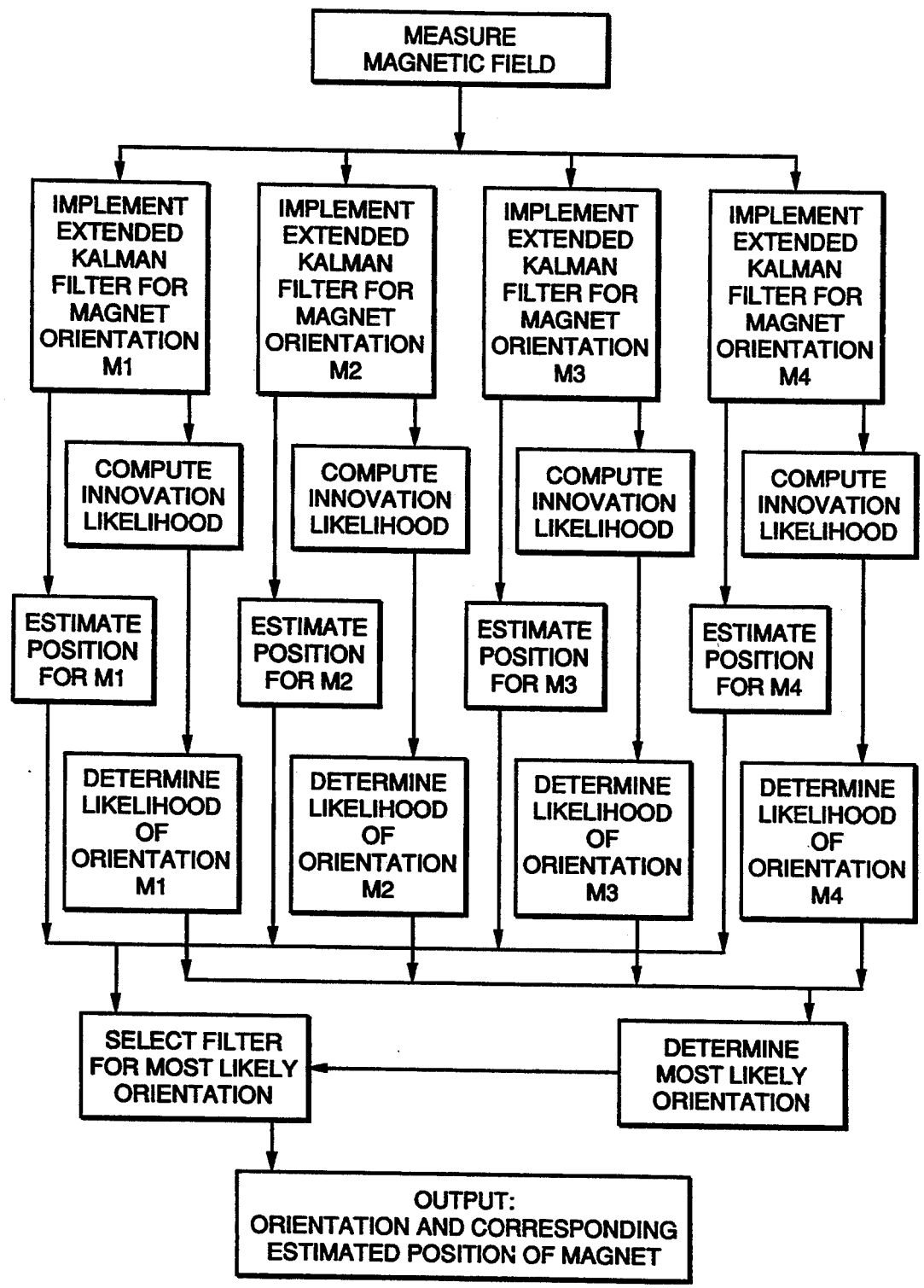
FIG. 1 is a flow diagram illustrating the basic steps in the present method of determining the location and orientation of magnetic dipoles.

The present invention comprises a method of estimating the location and orientation of permanent magnets (magnetic dipoles) embedded in the pavement of an Intelligent Vehicle Highway System (IVHS). Magnetic fields from the embedded magnets are measured (i.e., read) by magnetic sensors mounted on automotive vehicles as the vehicles pass over the magnets on the highway. The magnets are embedded in the highway so as to have a finite number of known orientations. The orientations of the magnets provide the "symbols" of coded data, comprising a sequence of orientations of a plurality of magnets, that can be used to provide information to the vehicle and/or its occupants. The encoded data may include vehicle guidance information, such as the distance ahead to curves (and radii of curvature), and/or other pertinent highway information, such as approaching exits, for example. Such information can also enhance the performance of the vehicle control system by making it less sensitive to noise and/or loss of data from a missing magnet, for example. Decoding information provided by the embedded magnets requires determining the locations and orientations of the magnets. The present invention combines extended Kalman filtering with Schweppe likelihood estimation to process the received magnetic signals and determine the relative location and orientation of the embedded magnets.

Because the orientations of the magnets are used to encode information, the orientation of any particular magnet cannot be known a priori by the sensors. Therefore, both the orientation and the location of each magnet must be estimated by the sensor system. Typically, only a finite number of discrete orientations of the magnets are used in coding information. The a priori knowledge that the orientation of each magnet must be one of a given set of possible orientations is information that can be used to advantage in determining the actual orientation of each detected magnet.

Given a sequence of field measurements along a straight line in the vicinity of a magnetic dipole, the objective is to estimate the three position components and the three dipole moment components of the magnet. These components may be represented in vector form as the position vector $x=[x_1 x_2 x_3]^T$ and the dipole moment vector $m=[m_1 m_2 m_3]^T$, where the superscript "T" denotes transposition. The variables $x_1$, $x_2$, $x_3$, $m_1$, $m_2$, and $m_3$ are to be determined. If the coordinate system for x and m is fixed with respect to the dipole, as for magnets embedded in a highway, these state variables are nondynamic. That is, they are unknown but effectively constant.

Uncertainties associated with magnet location and orientation information obtained from magnetic sensors can be derived by systems analysis based on statistical estimation theory for linear dynamic systems. The linear stochastic system model permits one to solve for the Gaussian probability density functions of the errors in the estimates of location and orientation of the magnets as functions of the covariances of the noise processes and geometries involved. The unbiased estimator assures that the averages (means) of these distributions are zero. Thus, the problem is to determine the variances of these distributions about the mean.

The basic steps of the present invention are illustrated in the flow diagram of FIG. 1. The output of a magnetic field detector mounted under an automotive vehicle is provided to a plurality of extended Kalman filters. An extended Kalman filter is implemented for each of the predetermined, finite number of orientations (as indicated, for example, by dipole moments m1-m4 in FIG. 1) of magnets embedded in the highway. In the preferred embodiment (comprising twice the number of filters shown in FIG. 1), eight extended Kalman filters are implemented, one for each of eight different orientations of the embedded magnets. Each Kalman filter generates an estimate of the relative position of the magnet (i.e., with respect to the detector) based on the detected signal and the orientation assumed by that filter. As the vehicle and detector pass over the embedded magnet, successive magnetic field measurements and iterations of each of the Kalman filters refine the position estimate for each assumed orientation. Each Kalman filter also generates an "innovation" matrix and determines the likelihood that the orientation assumed by that filter is the correct (i.e., actual) orientation of the detected magnet. Using Schweppe likelihood estimation techniques, the relative likelihoods of the possible magnet orientations are classified to determine the most likely orientation (m) of the detected magnet. The Kalman filter associated with the most likely orientation (m) is selected to output the orientation (m) and the estimated position (x) of the embedded magnet.

Kalman Filtering

A Kalman filter is an estimator for an unknown vector x, given measured vectors z, in which the linear equation $$z = Hx + v$$

describes the dependence of the measured vector z on the unknown vector x. The symbol H represents a known matrix, called a "measurement sensitivity matrix," and the symbol v represents the unknown vector of measurement errors.

The Kalman filter maintains an estimated value for the unknown vector quantity x as a sequence of measurements is made. The currently estimated value x is used to predict the value of a measurement, by the equation $$\hat{z} = H\hat{x},$$

where $\hat{x}$ is the estimated value of x and $\hat{z}$ is the predicted value of z.

The difference between the actual measurement $\hat{z}$ and its predicted valued z is called the measurement "innovation." The innovation is used as "feedback" to correct the estimate:

$$\hat{x} := \hat{x} + K(z - \hat{z}),$$

where the matrix K is called the "Kalman gain" and the symbol ":=" denotes replacement (i.e., the quantity on the left-hand side of the replacement symbol is replaced by the quantity on the right-hand side of the symbol.

The calculation of the Kalman gain depends on quantities describing the uncertainty of the estimated and measured quantities. These uncertainties are represented by covariance matrices, which are the expected values of the outer products of the errors. These errors are defined as the differences between the true values of the quantities and the values that are estimated or measured. Because these values are vectors, their outer products are matrices. By this definition, covariance matrices are always square, symmetric, and non-negative definite.

The decrease in the covariance matrix for the uncertainty in the estimate of x, given the measurement z, is described by the matrix equation $$P := P - KHP,$$

where the Kalman gain $$K = PH^T(HPH^T + R)^{-1},$$

where R is the (known) covariance matrix of measurement uncertainty, the superscript "T" denotes transposition of a matrix, and the superscript "−1" denotes the inverse of a matrix.

The inverse of a covariance matrix is called an "information matrix." The matrix $$Y = (HPH^T + R)^{-1}$$

in the formula for the Kalman gain K is the information matrix of the innovations.

Extended Kalman Filtering for Estimating Magnet Location

An extended Kalman filter is a non-rigorous extension of the Kalman filter for problems in which the dependence of the measurable quantities z on the quantities x to be estimated is not a linear function, but is a differentiable function. It uses the partial derivatives of the measurement z with respect to the unknown vector x to approximate the measurement sensitivity matrix H. These partial derivatives are evaluated at the estimated value of x.

In this application of extended Kalman filtering to estimating the location of a magnetic sensor on a vehicle relative to a magnet buried in the highway, the vector x represents three orthogonal coordinates of the sensor with respect to the magnet. The vector z represents the output of the magnetic sensor, which measures the perturbation in the magnetic flux density due to the presence of a magnet in the highway with some unknown dipole moment vector m. The dependence of z on x and m may be expressed by the following formulas:

$$z(x,m) = B(x,m) + v,$$

$$B(x,m) = \frac{\mu_0}{4\pi|x|^5}[3x\,x^T - |x|^2 I]\,m,$$

where z is the measured flux density, v is the sensor noise, B is the actual flux density, I is the identity matrix, and $\mu_0$ equals $4\pi 10^{-7}$ in SI units. B is a nonlinear, but differentiable, function of x. The measurement sensitivity matrix H can be approximated by the partial derivative of B with respect to x as follows:

$$H \approx \partial/\partial x B(x,m)|x=\hat{x},$$

which is evaluated at the estimated value of x. These partial derivatives can be derived from the above formula for B(x,m). The partial derivatives are also known functions of the relative locations of the sensors and magnet. Because z and x are vectors, H will be a matrix of partial derivatives.

For the extended Kalman filter, the predicted measurement is given by the formula $$\hat{z} = B(\hat{x}, m).$$

Except for these formulas of z and H, the formulas for the rest of the extended Kalman filter are the same as those for the conventional Kalman filter.

Combined Estimation of Orientation and Location

If the estimation problem is properly modeled, the innovations from successive measurements are a zero-mean Gaussian white noise process. Thus, the probability density of the innovations $z-\hat{z}$ can be calculated using the well-known formula for Gaussian probability distributions:

$$p(z-\hat{z})=(det\ Y/(2\pi)^n)^{\frac{1}{2}}exp(-(z-\hat{z})^T Y(z-\hat{z})/2),$$

where n is the dimension of z, exp is the exponential function, Y is the information matrix of the innovations (given by the formula above), and det Y is the determinant of Y. Because successive innovations are statistically independent, the relative probability of an observed innovations sequence, given the model of the measurement process, is the product of the individual innovations computed by the above formula.

Schweppe likelihood ratio detection is a signal detection method based on Kalman filtering. It is used for detecting a signal in noise by using two linear stochastic processes models—one for the noise alone and another for the signal plus the noise. A separate Kalman filter is then used for estimating the state of each of these contending models for the measured stochastic process. The resulting innovations for each model are used to compute the relative probabilities of the respective innovations sequences, given the respective model. These results and Bayes' rule are then used to calculate the relative likelihoods of two alternative models for the measurement process, given the observed measurement sequence. The likelihood ratio is used to detect the presence of a signal in noise.

A generalization of Schweppe likelihood ratio detection (for more than two alternative signal process models) is used for determining orientations of the magnets embedded in the highway. In this application, the possible models for the measurement process correspond to the possible values of the moment vector m. An extended Kalman filter is used for each value of m. The measurement innovations sequences from each the extended Kalman filters are used to compute the relative likelihoods of the different possible magnet orientations. The most likely magnet orientation, given the actual measurement sequence, is selected.

The Kalman filter corresponding to the selected magnet orientation is also used for estimating the relative location of the vehicle (i.e., the sensor) with respect to the magnet. In this way, the combined procedure of the present invention determines both the orientation and the relative location of each magnet. The value m=0 corresponds to a missing magnet. This possibility can be included among the alternative models to detect missing magnets and ignore the corresponding location information in vehicle steering calculations.

In operation of the present invention, it is possible that the detected magnetic signal is highly unlikely for all of the magnet orientations of the assumed finite set represented by the Kalman filters. This can happen, for example, because of unusually large additive noise, a missing or defective magnet, or the presence of interfering magnetic sources, such as ferromagnetic litter on the highway. In these "wild" signal situations, the computed likelihoods can be compared with their expected values, which can be obtained by computing a probability density function. In addition, Schweppe likelihood estimation can be further extended to use the detector as a decoder of the data provided by the orientation sequence of the plurality of embedded magnets. The relative likelihood information can be used for detection and correction of decoding errors. Failure of the decision process at a symbol (i.e., one magnet orientation) to arrive at a clearly defined decision (resulting from a missing or defective magnet, for example) can be carried to a higher decoding level in which possible sequences of symbols and their relative likelihoods can be used to select the most likely sequence.

Although the present invention has been described with respect to specific embodiments thereof, various changes and modifications can be carded out by those skilled in the art without departing from the scope of the invention. Therefore, it is intended that the present invention encompass such changes and modifications as fall within the scope of the appended claims.

I claim:

1. A method of determining the location and orientation of a magnet having one of a known set of orientations, comprising the steps of:
   providing a plurality of extended Kalman filters, each of said extended Kalman filters corresponding to an assumed one of the known set of possible magnet orientations;
   measuring a magnetic field produced by the magnet;
   providing sensor signals corresponding to said measured magnetic field to each of said plurality of extended Kalman filters;
   each of said extended Kalman filters generating an estimate of the relative location of the magnet based on said assumed orientation and generating a likelihood that said assumed orientation corresponds to the orientation of the magnet;
   determining the most likely one of said assumed orientations;
   selecting the one of said Kalman filters corresponding to said most likely one of said assumed orientations; and
   providing output signals corresponding to said most likely orientation and estimate of the relative location of the magnet generated by said selected Kalman filter.

2. The method of claim 1, wherein the step of measuring said magnetic field comprises making a sequence of measurements.

3. The method of claim 2, wherein the step of generating an estimate of the magnet location further comprises generating measurement innovations sequences from each of said extended Kalman filters.

4. The method of claim 3, wherein the step of determining the most likely one of said assumed orientations further comprises computing relative likelihoods of said assumed orientations from said measurement innovations sequences.

5. A method of determining the location and orientation of a magnet having one of a known set of orientations, comprising the steps of:
   providing a plurality of extended Kalman filters, each of said extended Kalman filters based on an assumed orientation corresponding to one of the known set of orientations of the magnet;
   making a sequence of measurements of a magnetic field produced by the magnet;

providing sensor signals corresponding to said magnetic field measurements to each of said plurality of extended Kalman filters;

each of said extended Kalman filters generating an estimate of the relative location of the magnet, generating measurement innovations sequences comprising differences between each of said measurements and a predicted value, and feeding back said innovations to correct said relative location estimate;

computing relative likelihoods of each of said assumed orientations from said innovations sequences using Schweppe likelihood ratio detection;

selecting the one of said extended Kalman filters corresponding to the most likely one of said assumed orientations; and providing output signals from said selected Kalman filter corresponding to said most likely orientation and relative location estimate of the magnet.

6. The method of claim 5, further comprising the steps of:

measuring magnetic fields produced by a plurality of magnets in sequence, each of said magnets having one of said set of known orientations, said sequence of magnets providing coded data; and determining orientation and location of each of said plurality of magnets; and receiving said coded data from said sequence of magnets.

7. The method of claim 5, wherein the step of measuring magnetic fields comprises measuring magnetic fields of magnets embedded in a highway with sensors mounted on an automotive vehicle.

8. A method of determining the location and orientation of a magnet embedded in a highway with one of a known set of orientations, comprising the steps of:

providing an automotive vehicle with a magnetic sensor;

making a sequence of measurements of a magnetic field produced by the magnet as said vehicle passes over said magnet;

providing a plurality of extended Kalman filters, each of said extended Kalman filters based on an assumed orientation corresponding to one of the known set of orientations of the magnet;

providing signals corresponding to said magnetic field measurements from said sensor to each of said plurality of extended Kalman filters;

each of said extended Kalman filters generating an estimate of the relative location of the magnet, generating measurement innovations sequences comprising differences between each of said measurements and a predicted value, and feeding back said innovations to correct said relative location estimate;

computing relative likelihoods of each of said assumed orientations from said innovations sequences using Schweppe likelihood ratio detection;

selecting the one of said extended Kalman filters corresponding to the most likely one of said assumed orientations; and providing output signals from said selected Kalman filter corresponding to said most likely orientation and relative location estimate of the magnet.

9. The method of claim 8, further comprising the steps of:

measuring magnetic fields produced by a plurality of magnets embedded in sequence in said highway, each of said magnets having one of said set of known orientations, said sequence of magnets providing coded data; and determining orientation and location of each of said plurality of embedded magnets; and receiving said coded data from said sequence of embedded magnets.

10. The method of claim 9, further comprising the step of using said orientation relative likelihoods for detection and correction of decoding errors from said sequence of embedded magnets.

* * * * *